UNITED STATES PATENT OFFICE.

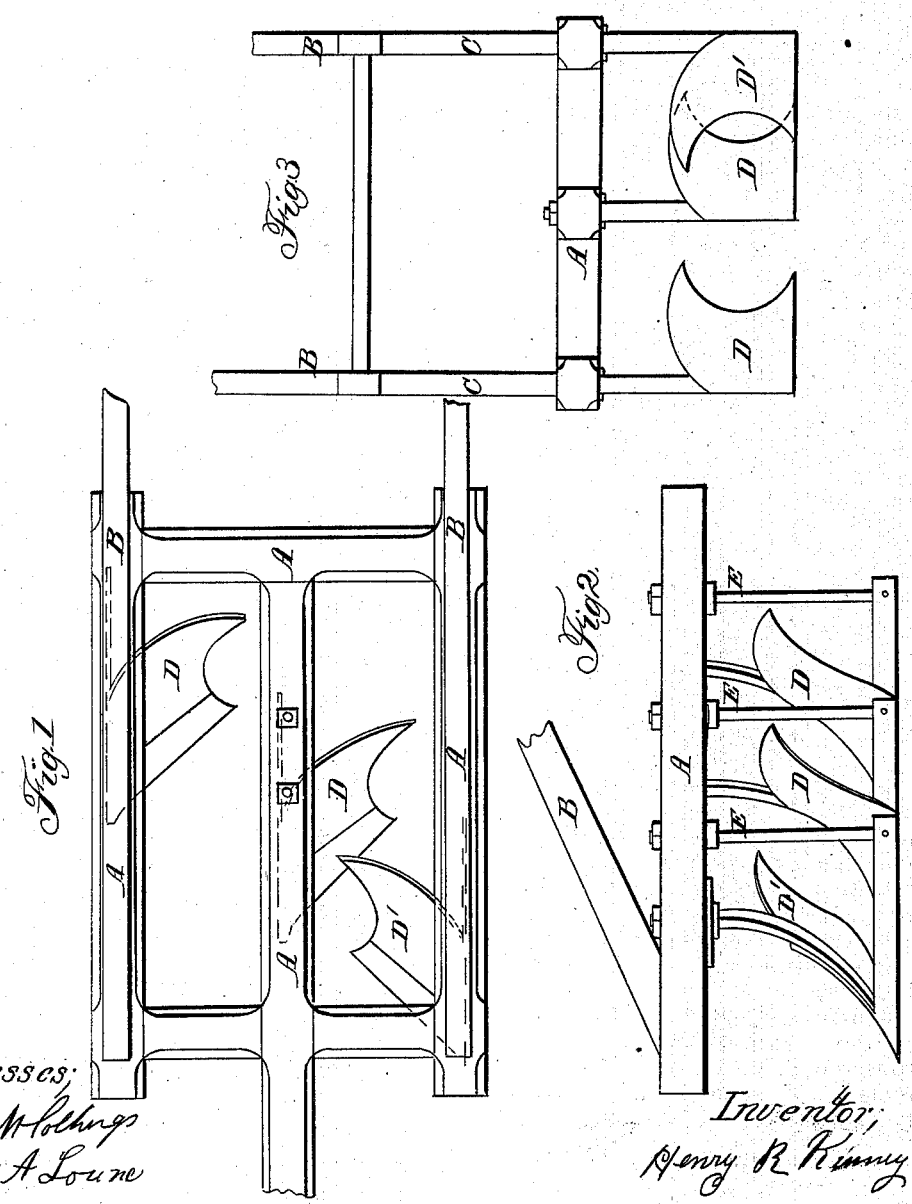

HENRY R. KINNEY, OF PORTSMOUTH, OHIO.

IMPROVEMENT IN CULTIVATORS.

Specification forming part of Letters Patent No. 26,682, dated January 3, 1860.

*To all whom it may concern:*

Be it known that I, HENRY R. KINNEY, of Portsmouth, in the county of Scioto and State of Ohio, have invented a new and Improved Plow for the Cultivation of Corn and other Crops; and I do hereby declare that the following is a full, clear, and exact description thereof, reference being had to the accompanying drawings, forming a part of this specification, in which—

Figure 1 represents a plan view of my improved plow. Fig. 2 is a side elevation of the same. Fig. 3 is a front end view of the plow.

Similar letters of reference indicate corresponding parts in the three figures.

My invention is intended for the cultivation of corn, cotton, and other crops usually planted in rows, for the purpose of loosening the soil and rendering it mellow, so that moisture and air may penetrate to the roots of the plants and facilitate their growth.

The nature of my invention consists in the arrangement of the furrow-plows, adjusting devices, and frame, so that the plows may be all adjusted and shall all stand on the same side of a row of plants, and one of them turn up a furrow-slice from close alongside young plants, and another receive the same and return it in a loose or friable condition back against the roots of the plants, and the other plow up the remaining portion of the soil between two rows of plants, substantially as herein set forth.

To enable others skilled in the art to understand my invention, I will proceed to describe its construction and operation.

A represents a quadrangular frame, composed of three beams, to which the plows are attached in a manner hereinafter described.

B are the handles for guiding the plows along the row, which are attached to the front part of frame A, and are carried back and supported by two standards, C C.

The plows D D D' are arranged under the frame, so that one will succeed the other, in a manner similar to a gang of plows, with the exception that the mold-board of plow D' is reversed and throws the soil from the plants toward the right or center of the machine, where it is received by the next succeeding plow, which throws it to the left or fills up the furrow thus made. The third and last plow, which runs in the center between two rows, turns the soil over and covers up the furrow made by its preceding plow, leaving a furrow in the center between the two rows. In returning in the same space between the two rows the opposite row is cultivated precisely in the same manner as described for the first operation, leaving the center space between the rows thoroughly plowed and level, except a small furrow in the center of the space which is left by the rear plow in passing up and down the rows.

In order that the points of the plows may be adjusted so as to regulate the depth for the plows to run under the surface of the ground, I have carried the landsides E E E back a suitable distance and attached to the heel of each a vertical brace, F, which passes up through the parallel beams of frame A and receives a nut both on top of the beam and under it, so that by screwing the lower nut down and tightening up the upper nut the point of the plow will be depressed, and by reversing the nuts the points of the plows will be elevated.

What I claim as my invention, and desire to secure by Letters Patent, is—

The arrangement of the furrow-plows D D D', adjusting devices E E E, and frame A B C in the manner set forth.

HENRY R. KINNEY.

Witnesses:
P. C. KINNEY,
W. H. RAYNOR.